United States Patent [19]

Jackson et al.

[11] 4,277,208
[45] Jul. 7, 1981

[54] TOOL GUIDE

[75] Inventors: Ronald A. Jackson, Brockville; John Maruscak, Athens, both of Canada

[73] Assignee: Black & Decker Inc., Newark, Del.

[21] Appl. No.: 64,016

[22] Filed: Aug. 6, 1979

[51] Int. Cl.³ .................... B23B 45/14; B23B 49/00
[52] U.S. Cl. .................................. 408/14; 408/16; 408/110
[58] Field of Search ............... 408/14, 16, 110, 100, 408/112, 115, 116, 712, 76

[56] References Cited

U.S. PATENT DOCUMENTS

| | | | |
|---|---|---|---|
| 2,110,537 | 3/1938 | Tautz | 408/16 |
| 2,490,307 | 12/1949 | Karr | 408/16 |
| 3,874,810 | 4/1975 | Russell | 408/14 |
| 3,890,058 | 6/1975 | Self et al. | 408/112 |

Primary Examiner—Z. R. Bilinsky
Attorney, Agent, or Firm—Harold Weinstein; Leonard Bloom; Edward D. Murphy

[57] ABSTRACT

A tool guide for providing a stationary support for a portable power tool such as an electric drill. When the lower portion of the device is clamped between the vise jaws of a portable workbench and vise, an electric drill slidably mounted on the device may be used to drill either perpendicular or angular holes in a workpiece positioned on top of the vise jaws. An adjustable depth stop operatively associated with the slideway of the device provides accurate depth control. The device may also be used independently in order to add accuracy to free hand drilling for both perpendicular and angular holes.

12 Claims, 14 Drawing Figures

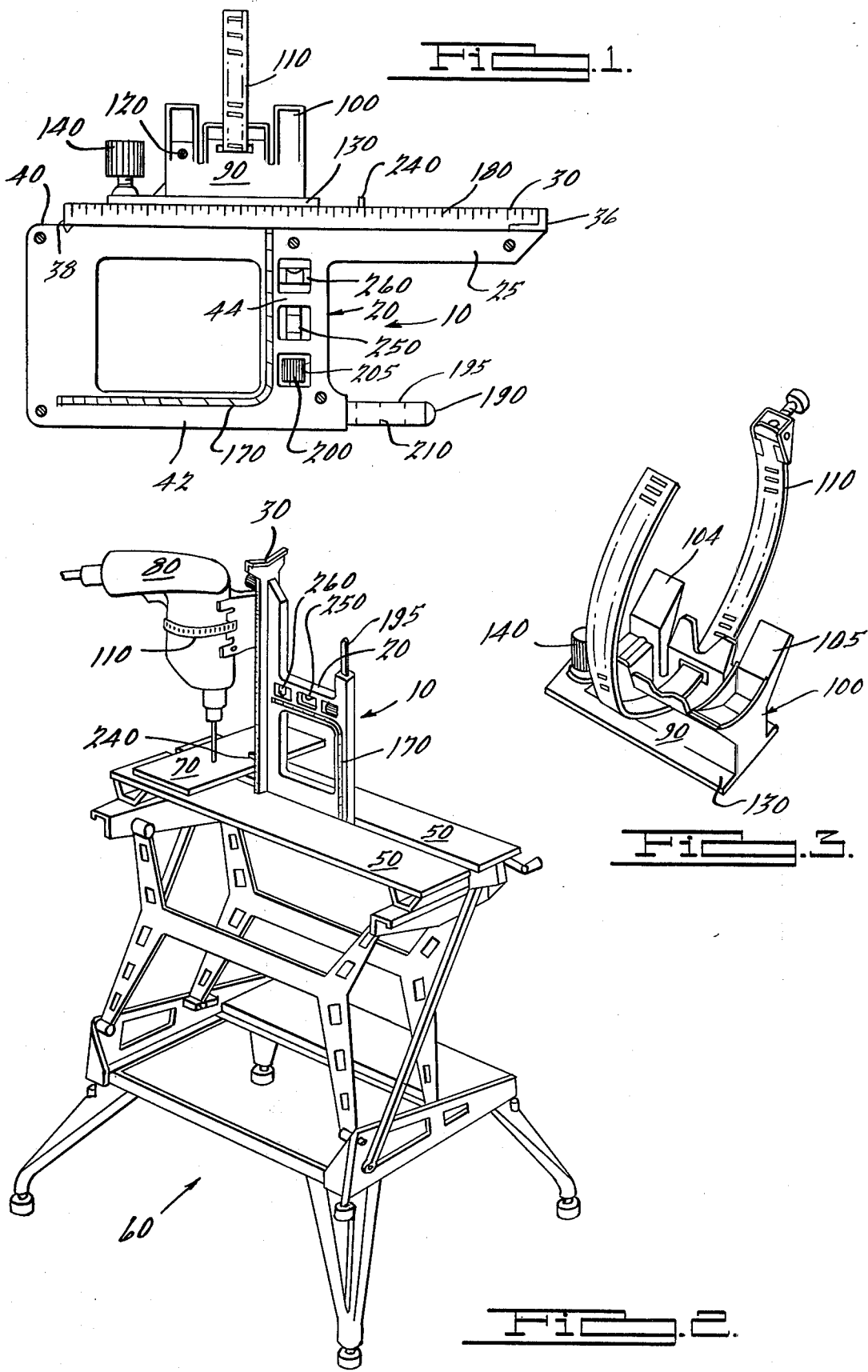

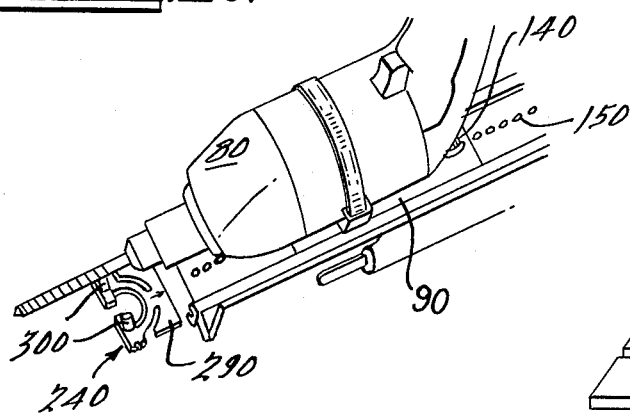
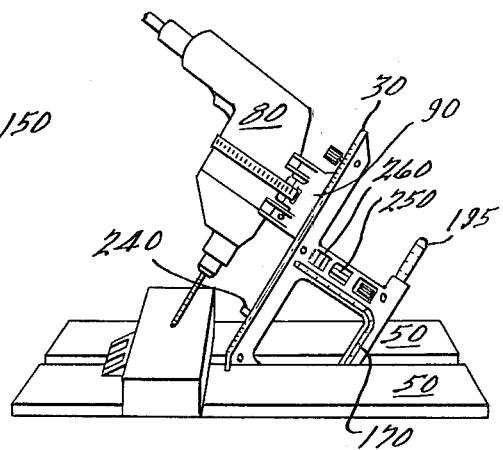
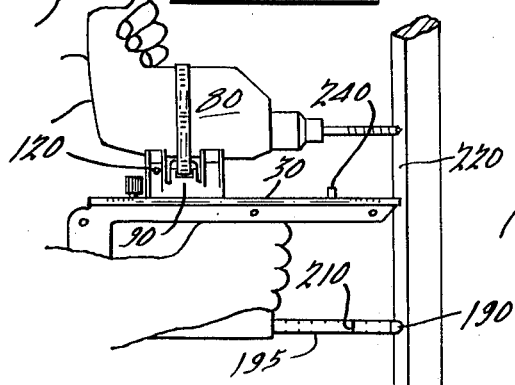
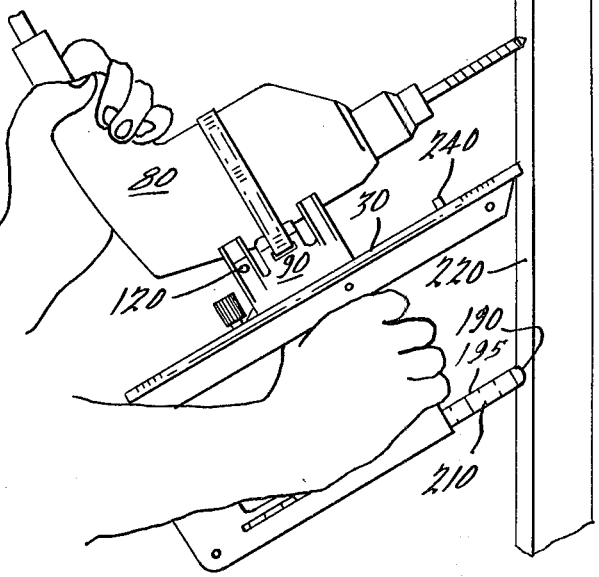
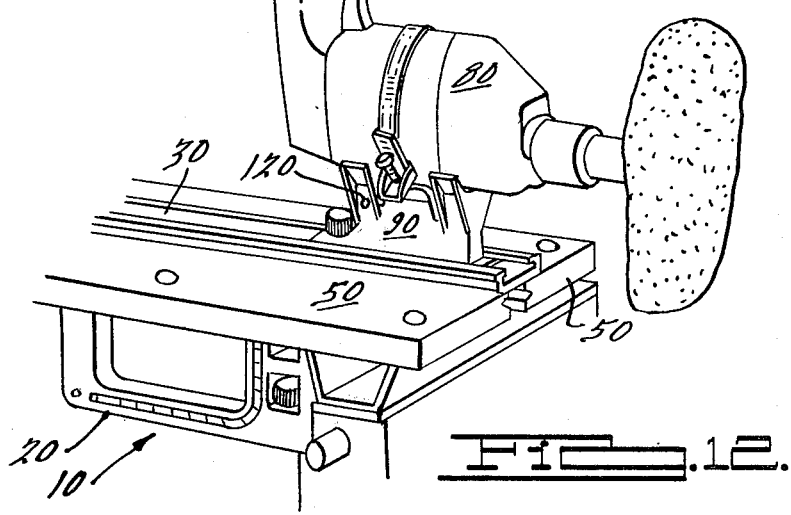

TOOL GUIDE

BACKGROUND AND SUMMARY OF THE INVENTION

The present invention pertains primarily to tool holding or tool guiding devices, and more particularly to alignment devices for electric power tools such as electric drills or the like.

Tool guides of the general type to which the present invention pertains are known in the art and embody a variety of design approaches. However, most known prior art designs are intended to be utilized as stand-alone structures for providing complete support for the drill or other portable tool secured thereto. The principle disadvantage with this approach is that it typically requires a substantial base structure to support the tool which adds to the weight of the tool guide making it cumbersome to use as a freehand support. As an additional consequence, such tool guides are not readily adaptable for use in combination with the portable workbench and vise structures which have become increasingly popular with home hobbyists.

Accordingly, it is the principle object of the present invention to provide an improved portable tool guide that does not require a base structure and therefore is lightweight and particularly adapted for use as a freehand support or in combination with a portable workbench and vise.

In general, the tool guide according to the present invention comprises a generally U-shaped body with one leg thereof integrally defining an elongated slideway having slidably engaged therewith a tool holder for securing a drill or the like to the tool guide. The transverse portion of the body extends beyond the slideway in the longitudinal direction and defines a clamping support adapted to be inserted between vise jaws or the like for providing a rigid support for the tool guide. In this respect, the particular adaptability of the present invention for use in combination with a portable workbench and vise can be generally appreciated. In addition, the transverse portion as well as the remaining leg portion of the body preferably have a reduced thickness relative to the slideway so that the bottom of the slideway will abut the work surface of the workbench when the transverse body portion is clamped between the vise jaws of the bench. The rearward point of the slideway together with the angle markings provided along the remaining leg portion of the body thus serve as a convenient means for accurately adjusting the angle at which the slideway is set relative to the work surface when the tool guide is clamped to the workbench.

The leg portion of the body spaced apart from the slideway also has an arm that is extendible from and retractible into the leg portion of the body. When using the tool guide in the free-hand manner, the forward or free-end of the slideway together with the exposed end of the arm define a two-point support for resting the tool guide against a work surface. By adjusting the distance the arm extends from the body, the angle of the slideway relative to the work surface can be adjusted anywhere between 45° and 90°.

An adjustable depth stop is provided that is selectively positionable at any point along the length of the slideway to limit movement of the tool holder along the slideway and hence the depth of penetration, for example, of a drill bit into a workpiece.

Additional advantages and features of the present invention will become apparent from a reading of the detailed description of the preferred embodiment which makes reference to the following set of drawings in which:

BRIEF DESCRIPTION OF THE DRAWINGS

FIG. 1 is a front elevational view of the tool guide of the present invention;

FIG. 2 is a perspective view of the tool guide of the present invention in use in combination with a portable workbench and vise;

FIG. 3 is a perspective view of the tool holder portion of the tool guide of the present invention;

FIG. 8b is an elevational view of the depth stop shown in FIG. 8a;

FIG. 8c is a perspective view illustrating the insertion of the depth stop into the slideway of the tool guide;

FIG. 9 is a perspective view of the tool guide of the present invention clamped between vise jaws in use to guide an electric drill in making an angular hole;

FIG. 10 is a perspective view of the tool guide of the present invention in free-hand use to guide an electric drill in making a perpendicular hole;

FIG. 11 is a perspective view of the tool guide of the present invention in free-hand use to guide an electric drill in making an angular hole; and FIG. 12 is a perspective view of the tool guide of the present invention clamped between vise jaws in use to hold an electric drill for stationary use.

DETAILED DESCRIPTION OF THE PREFERRED EMBODIMENT

Figure 4:
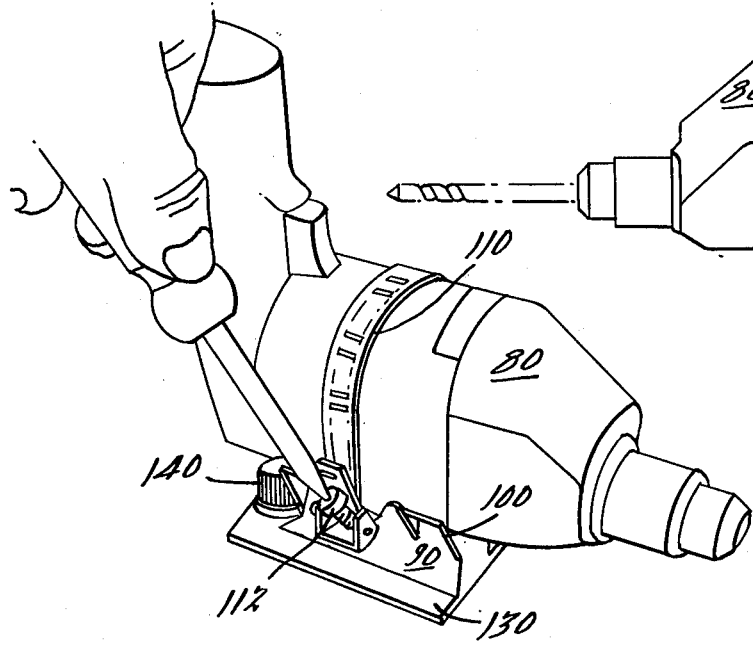
FIGS. 4 and 5 are perspective views illustrating an electric drill mounted in the tool holder of FIG. 3.
Figure 5:
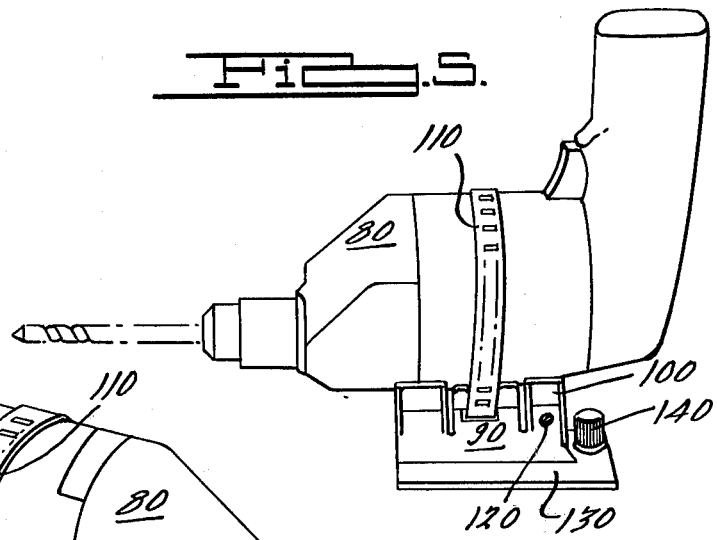
Figure 6:
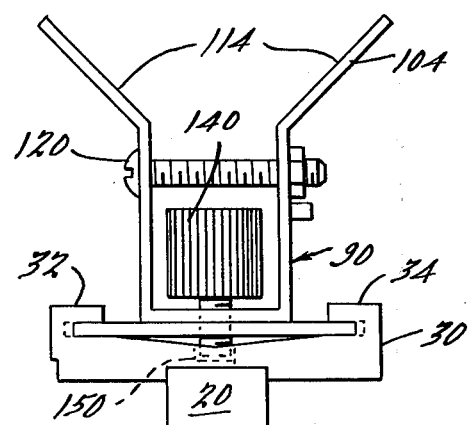
FIG. 6 is an end view of the tool holder of the tool guide illustrated in FIG. 1.

Referring to FIG. 1, a tool guide 10 according to the present invention is shown. The tool guide 10 comprises a substantially U-shaped body 20 defining a first leg portion 25 having integrally associated therewith a slideway 30 which extends substantially the entire length of the body 20. As best shown in FIG. 6, the slideway 30 has a pair of inwardly extending flanges 32 and 34 formed along its entire length which are adapted to receive for sliding engagement therewith a tool holder 90. The transverse end portion 40 of the body 20 extends beyond the slideway 30 in the longitudinal direction so as to provide a clamping surface for securing the tool guide 10 to a portable workbench and vise structure 60 of the general type illustrated in FIG. 2. In addition, the width of the slideway 30 is substantially greater than the uniform thickness of the remainder of the body 20 including the transverse end portion 40. The purpose for this is to permit the tool guide 10 to be secured between the vise jaws 50 of a portable workbench 60 in various canted positions (as illustrated for example in FIG. 9) so that the slideway 30 can be set to any angle between 0° and 90° relative to the work surface of the workbench 60.

To assist the operator in securing the tool guide to a workbench 60 at a desired angle, the second leg portion 42 as well as the intermediate transverse portion 44 of the body 20 have angular markings 170 provided thereon which are referenced to the rearward point 38 of the slideway 30 to provide a two-point reference system for positioning the tool guide 10 in the vise 50. More particularly, to set the angle of the slideway 30 at a desired angle between 0° and 90° relative to the work surface, the transverse end portion 40 of the body 20 is inserted into the vise 50 until the end 38 of the slideway 30 abuts the work surface, and then the body 20 of the tool guide 10 is rotated until the desired angular marking 170 is aligned with the work surface. The vise 50 is then closed to lock the tool guide 10 in place.

Returning to FIG. 1, the second leg portion 42 of the body 20 contains an arm 195 which is extendible from leg portion 42 in a direction substantially parallel to slideway 30. Once extended the position of the arm 195 is locked by tightening a knurled knob 200 which is fastened to a threaded shaft that frictionally engages the edge of arm 195. It will be noted that locking knob 200 is preferably disposed in an opening 205 formed in transverse member 44 so that the knob 200 does not extend beyond either clamping surface of the body 20. In this manner, locking knob 200 will not contact the vise jaws 50 when the portion of the body 20 adjacent the opening 205 is secured in the vise of a portable workbench 60.

The purpose of the adjustable arm 195 is to provide a point of support for the tool guide 10 when it is used in the free-hand manner. In particular, the tip 190 of arm 195 together with the free-end 36 of slide-way 30 define a two-point support for resting the tool guide 10 against a work surface 220 as illustrated in FIGS. 10 and 11. By adjusting the distance arm 195 protrudes from the body 20 of the tool guide 10, it will be appreciated that the angle of slideway 30 relative to the work surface 220 can be varied accordingly. Degree markings 210 from 45° to 90° are provided on arm 195 to assist the user in accurately setting the desired angular position of the tool guide 10. In addition, it will be noted that the intermediate transverse portion 44 serves as a convenient hand grasp for holding the tool guide 10 when it is used in the free-hand manner illustrated in FIGS. 10 and 11.

Referring now to FIGS. 1 and 3-6, a tool such as a portable power drill 80, is secured to the tool guide 10 by means of a tool holder 90 which is slidably engaged in slideway 30. Tool holder 90 comprises a base portion 130 that engages with slideway 30 and a saddle portion 100 adapted to support the body of the drill 80. Saddle portion 100 comprises a pair of "Y" support members 104 and 105 that are particularly adapted for providing a rigid support for a tool having a substantially circular body, such as a drill. However, it is to be understood that a differently configured saddle portion could be substituted for supporting a special type of tool. The drill 80 is secured to the saddle portion 100 of tool holder 90 by means of an adjustable band that is adapted to be wrapped around the body of the drill 80 and tightened by turning screw 112 in the manner shown in FIG. 4. Once secured to tool holder 90, the orientation of the drill 80 can be accurately adjusted so that the drill bit is parallel with the slideway 30. As best illustrated in FIG. 6, this is acccomplished by adjusting the leveling screw 120 so that the distance between the supporting surfaces 114 of "Y" support member 104 are either contracted or expanded to thereby raise or lower the rearward end of the drill 80 as is appropriate.

Figure 7:
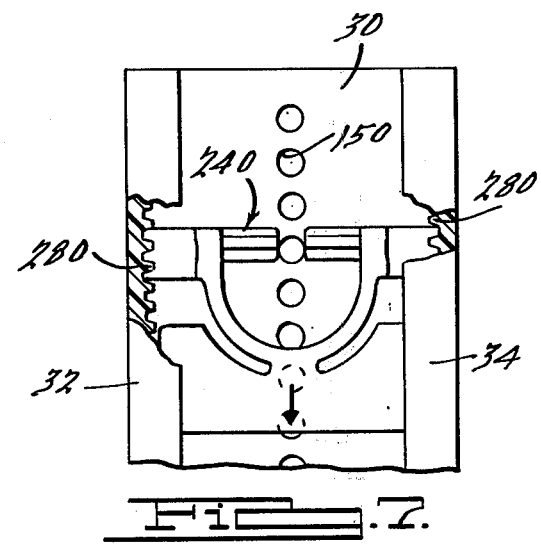
FIG. 7 is a partially cutaway plan view of the depth stop engaged in the slideway of the tool guide of the present invention.

Since it is desirable in certain applications to maintain the position of the tool stationary, such as when using a drill as a grinder or a buffing wheel as illustrated in FIG. 12, the tool holder 90 preferably includes means for fixedly securing the position of the tool holder 90 relative to the slideway 30. With particular reference to FIGS. 6 and 7, the tool holder 90 is provided with an adjustable locking element, herein a knurled knob 140, which is fastened to a screw shaft threadedly engaged and extendible through the base portion 130 of tool holder 90. The tool holder 90 is therefore locked into a particular position on the slideway by turning the locking knob 140 until the threaded shaft extends into one of the plurality of spaced apart holes 150 provided along the entire length of the slideway 30.

Referring now to FIGS. 7 and 8a–8c, the tool guide 10 of the present invention includes a novel drill depth stop 240 which is provided to selectively limit the amount of travel of the tool holder 90 along the slideway 30. Thus, it will be appreciated that when the tool guide 10 is used in combination with a drill, for example, the depth stop 240 can be utilized to limit the depth of penetration of the drill bit into a workpiece.

Figure 8A:
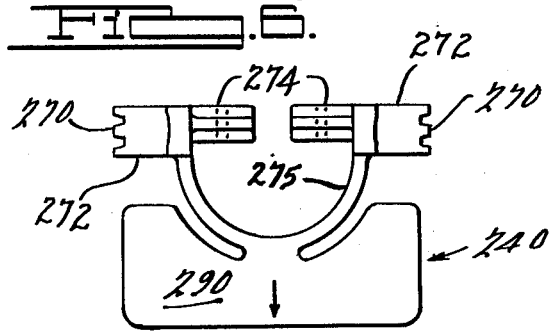
FIG. 8a is a plan view of the depth stop shown in FIG. 7.
Figure 8B:
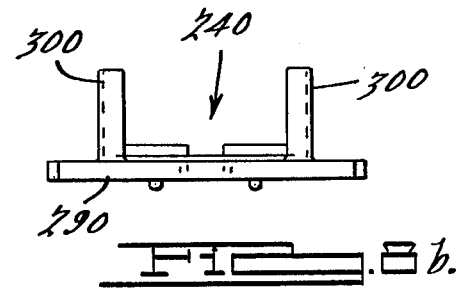

With particular reference to FIGS. 8a and 8b, the depth stop 240 comprises a base portion 290 having a width substantially equal to that of the tool holder 90 so that it is slidable along the slideway 30. The base portion 290 is integrally associated with a flexible U-shaped portion 275 having a pair of outwardly projecting tabs 272 at its free-ends thereof. Tabs 272 have formed along their outer edges a plurality of teeth 270 which are adapted to engage complementary teeth 280 formed on the inside surface of flanges 32 and 34 along the entire length of the slideway 30. A pair of upwardly projecting tabs 300 located at the free-ends of U-shaped portion 275 are provided for disengaging the teeth 270 of U-shaped portion 275 from the teeth 280 in slideway 30 so that the position of the depth stop 240 along the slideway can be changed. The inwardly projecting tabs 274 are provided to limit the amount by which the free-ends of U-shaped portion 275 can be squeezed together so that the arms of the U-shaped portion 275 do not lose their resiliency.

Looking to FIG. 8c, the depth stop 240 is preferably inserted into the forward end of the slideway 30 with its base portion 290 facing toward the tool holder 90. Due to the U-shaped configuration of the portion supporting locking tabs 272, the depth stop 240 can be freely moved along the slideway 30 in the direction of the arrow (see FIG. 7 also) without having to disengage the teeth 270 of U-shaped portion 275 from the teeth 280 in slideway 30. However, the depth stop 240 will effectively lock in position and resist movement along the slideway 30 in the opposite or forward direction unless teeth 270 are disengaged from teeth 280 in the manner described. Accordingly, it can be seen that once the position of the depth stop 240 is set, the tool holder 90 will be slidable in the forward direction along the slideway 30 until the forward edge of the tool holder abuts the base portion 290 of depth stop 240. To assist the user in setting the position of the depth stop 240, a scale 180 is provided along the exterior longitudinal surfaces of the slideway 30 as shown in FIG. 1.

As an additional convenience, the body 20 of the tool guide 10 is preferably provided with vertical and horizontal bubble-type levels, 250 and 260 respectively, as best shown in FIG. 1, to aid in aligning the tool guide 10 in the vertical and horizontal positions.

Thus, it will be appreciated from the above description that the tool guide of the present invention comprises an exceptionally versatile device capable of very accurate work. Moreover, when fabricated using plastic or the like as is preferred, the present portable tool guide is lighweight and, due to the relative simplicity of the design, inexpensive to manufacture.

While the above description constitutes the preferred embodiment of the present invention, it will be appreciated that the invention is susceptible to modification, variation and change without departing from the proper scope or fair meaning of the accompanying claims.

What is claimed is:

1. In a tool guide for supporting a portable power tool having a longitudinal slideway and a tool holder slidably engaged with slideway for securing a portable power tool to said tool guide; the improvement comprising a depth stop slidably engageable with said slideway and comprising first and second flexible leg portions having formed at the free-ends thereof a plurality of teeth adapted to engage complementary teeth formed along said slideway and disengagement means connected to said first and second leg portions for disengaging the teeth on said leg portions from the teeth in said slideway, said first and second leg portions projecting inwardly toward each other in a first longitudinal direction relative to said slideway such that said depth stop can be moved along said slideway in said first direction without utilizing said disengagement means but cannot be moved in the opposite direction along said slideway without utilizing said disengagement means.

2. The total guide of claim 1 wherein said disengagement means comprises a pair of upwardly projecting tabs connected to the free-ends of said leg portions.

3. The tool guide of claim 1 wherein said depth stop further includes opposed inwardly projecting tabs connected to the free-ends of said legs which are adapted to contact one another to limit the extent to which the free-ends of said legs can be squeezed together.

4. The tool guide of claim 1 wherein the body of said tool guide further includes a horizontal bubble-type level for assisting the user in orienting the tool guide horizontally.

5. The tool guide of claim 1 wherein the body of said tool guide further includes a vertical bubble-type level for assisting the user in orienting the tool guide vertically.

6. In a tool guide for supporting a portable power tool having a longitudinal slideway and a tool holder slidably engaged with said slideway for securing a portable power tool to said tool guide; the improvement comprising a depth stop slidably engageable with said slideway and comprising a base portion for providing an abutment for said tool holder, a generally U-shaped portion defining flexible legs having outwardly projecting teeth formed at the free-ends thereof which are adapted to engage complementary teeth formed along the inside surfaces of said slideway, and upwardly projecting tabs connected to said free-ends for squeezing the free-ends of said legs together to disengage the teeth of said depth stop from the teeth of said slideway; said U-shaped configuration permitting the free movement of said depth stop along said slideway toward said tool holder but preventing movement of said depth stop in the opposite direction without disengaging the teeth of said depth stop from the teeth of said slideway.

7. The tool guide of claim 6 wherein said depth stop further includes opposed inwardly projecting tabs connected to the free-ends of said legs which are adapted to contact one another to limit the extent to which the free-ends of said legs can be squeezed together.

8. The tool guide of claim 6 wherein the body of said tool guide further includes a horizontal bubble-type level for assisting the user in orienting the tool guide horizontally.

9. The tool guide of claim 6 wherein the body of said tool guide further includes a vertical bubble-type level for assisting the user in orienting the tool guide vertically.

10. In a tool guide for supporting a portable power tool having a longitudinal slideway and a tool holder slidably engaged with said slideway for securing a portable power tool to said tool guide; the improvement comprising means for limiting the travel of said tool holder along said slideway including a depth stop slidably engageable with said slideway and having formed along a surface thereof a plurality of teeth adapted to engage complementary teeth formed along said slideway and means for disengaging the teeth of said depth stop from the teeth of said slideway, the teeth on said depth stop being formed on a flexible portion thereof which permits the free movement of said depth stop along said slideway in the direction toward said tool holder but prevents the movement of said depth stop in the opposite direction without disengaging the teeth of said depth stop from the teeth of said slideway.

11. The tool guide of claim 10 wherein the flexible portion of said depth stop comprises a leg member having said teeth formed on a free-end thereof.

12. The tool guide of claim 10 wherein said flexible portion comprises a U-shaped member defining first and second flexible leg portions having said teeth formed at the free-ends thereof.

* * * * *